Jan. 30, 1945.   A. S. VOLPIN   2,368,183
DUAL LUBRICATION SYSTEM FOR VALVES
Filed July 25, 1942   2 Sheets-Sheet 2

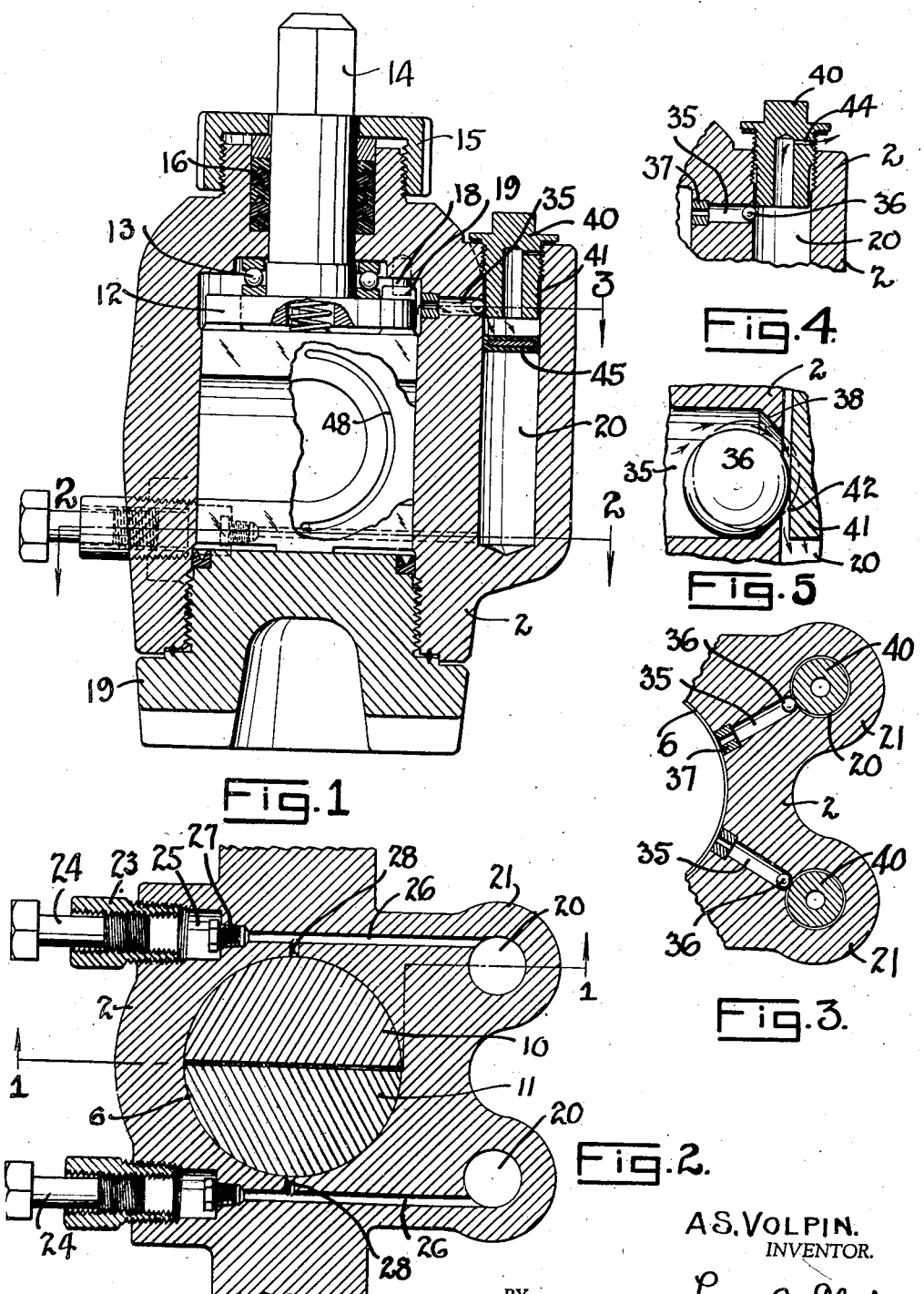

A. S. VOLPIN.
INVENTOR.

BY   Lester B. Clark.

ATTORNEY.

Patented Jan. 30, 1945

2,368,183

UNITED STATES PATENT OFFICE 2,368,183

DUAL LUBRICATION SYSTEM FOR VALVES

Alexander S. Volpin, Houston, Tex., assignor to Mission Manufacturing Company, Houston, Tex.

Application July 25, 1942, Serial No. 452,272

10 Claims. (Cl. 251—93)

The invention relates to an automatic dual lubricating system for plug valves.

In the operation of lubricated plug valves the valve is usually placed in the pressure line where the pressure is to be controlled and it is not uncommon at all that the attendant who is responsible for lubricating the plug valve, is often unaware of the direction of flow thru the valve. It is, of course, the down stream side of the valve which should be lubricated in order to maintain a seal against the pressure from the high pressure side and the present valve has therefore been devised with dual lubrication systems so that the valve may be used in either position in a pressure line and means is provided so that the attendant may readily test the valve to determine the direction of flow so as to apply lubricant to the down stream reservoir and avoid the waste of any lubricant by the introduction of an excessive amount in the high pressure side reservoir.

Another object of the invention is to provide entirely independent and dual lubricating systems for each side for a lubricated plug valve.

Another object of the invention is to provide lubricant reservoirs in the plug valve housing in such a manner that each reservoir may be tested to determine whether it is the high pressure or the low pressure reservoir.

Another object of the invention is to provide a two way check valve for the line pressure which is being applied to the lubricant reservoirs so that there will be no back flow of lubricant into the valve chamber and wherein the line pressure may be cut off from the reservoir as desired.

Still another object of the invention is to provide a reservoir cap for lubricated plug valves wherein the removing of the cap releases the line pressure check valve so as to cut off the line pressure to one end of the lubricant reservoir.

Another object of the invention is to provide a lubricant reservoir in the valve housing as distinguished from being positioned in the plug member so as to obtain a larger capacity in the reservoir.

Other and further objects of the invention will be readily apparent when the following description is considered in connection with the accompanying drawings wherein:

Fig. 1 is a section taken on line 1—1 of Fig. 2 and showing the reservoir and other parts in section.

Fig. 2 is a transverse section on the line 2—2 of Fig. 1.

Fig. 3 is a broken detailed section on the line 3—3 of Fig. 1.

Fig. 4 is a broken vertical section of the reservoir cap and two way check valve.

Fig. 5 is an enlarged sectional view of one of the check valve seats.

The invention relates generally to that type of lubricated plug valve shown in the patent to Dudley C. Sharp, No. 2,269,886, for Lubricated valve, which issued on January 13, 1942.

Figure 6:
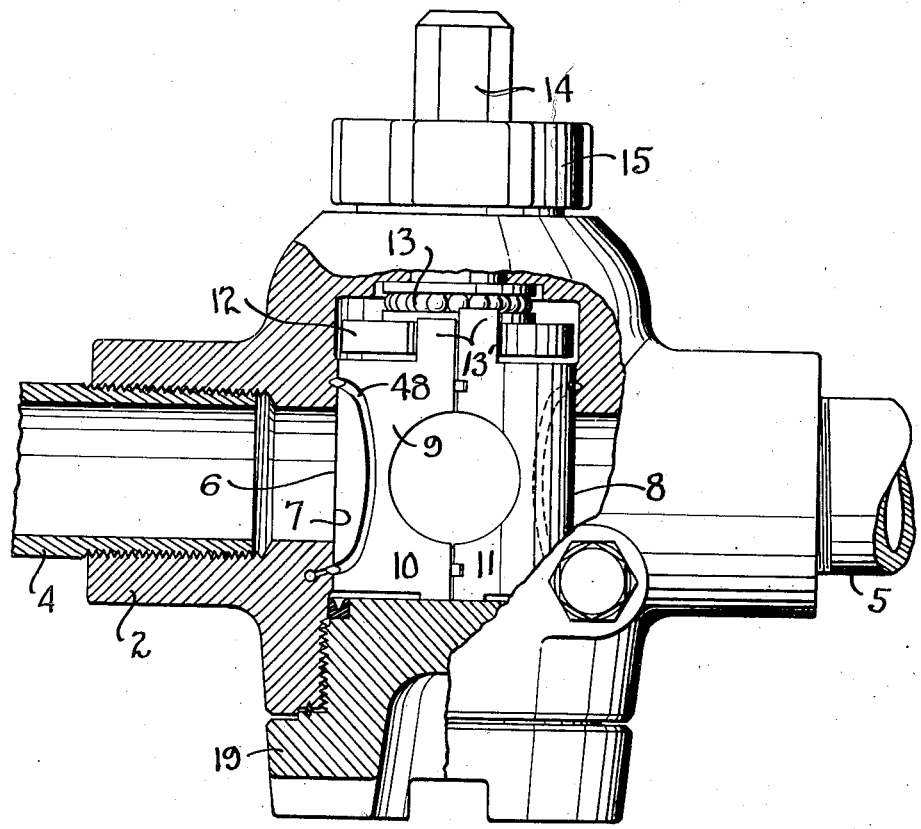
Fig. 6 is a side elevation with certain parts of the housing broken away to illustrate the general arrangement of the parts.

The parts of the valve are best seen in Fig. 6 where the housing 2 serves as a connection between the pipe ends 4 and 5. Either of these may be the high pressure side in accordance with the invention. The plug chamber 6 in the housing is a vertically disposed cylindrical chamber having the ports 7 and 8 as entrances and discharge ports for the fluid passing thru the valve. The plug 9 is preferably made up in two parts, 10 and 11, which are identical and are arranged for rotating movement by having the head 12 engage the lugs 13' on the respective parts. This head is mounted on antifriction bearings 13 so that the stem 14 thereof may be readily rotated. A hold down ring 15 is threaded to the housing to confine the stem packing 16, as best seen in Fig. 1. A stop pin 18 carried by the housing limits the movement of the head due to the engagement of a stud 19 of the head 12 therewith and a base portion 19 closes the bottom of the plug chamber 6.

The housing is of a peculiar configuration as is best seen by the sectional view of Fig. 2 in that one side thereof has the extended lobe portions 21, each of which is formed with a reservoir 20 therein. These reservoirs are parallel to the plug chamber and have a considerable length so as to provide a large volumetric capacity for lubricant.

Fig. 2 shows the manner of introducing the lubricant thru the nipples 23 which are threaded into the housing and each of which carries the spindle 24 for forcing lubricant from the area 25 on thru the passage 26 into each of the reservoirs. A check valve 27 prevents back flow of the lubricant. Each passage 26 not only serves to permit the introduction of lubricant into the reservoir 20 but it also serves as an outlet of the lubricant from the reservoir, in that it has the connecting branch 28 leading from the passage to the face 29 of the plug valve chamber 6 so as to connect with the distribution groove 30 on such face. In other words, when the reservoir is being filled, the lubricant moves in one direction thru the passage 26 to the reservoir, while in operation the lubricant moves in the reverse direction in the passage 26 for distribution to the plug member.

In order to effect this reverse flow, due to a predetermined pressure, a conduit 35 is provided adjacent the top of each reservoir, as is best seen in Figs. 1 and 3. This conduit leads from the top of the valve or plug chamber 6 into the top of each reservoir and the flow thru this passage is controlled by the two-way check valve 36. A seat 37 is provided at the end of the passage adjacent the plug chamber so that if there is a predominant pressure in the reservoir 20, the ball valve 36 will be forced against this seat 37 to prevent the escape of lubricant or pressure into the plug chamber. On the other hand, if the predominant pressure is in the plug chamber, the check valve will be forced to the position shown in Figs. 1, 3 and 5 against the seat 38, best seen in the enlarged view in Fig. 5. This seat is formed by tapering the ends of the passage 35 so as to reduce the diameter thereof and confine the valve 36.

A predetermined pressure in the valve chamber occurs due to the fact that the high pressure may tend to leak into the chamber so as to be available to force the other side of the plug member against the down-stream port.

In order to hold the check valve 36 in open position, as seen in Fig. 5, and permit the line pressure to enter the reservoir 20, a special cap 40 is shown in Fig. 1 as having been threaded into the top of the reservoir. This plug is of special construction in that the lower end 41 thereof is reduced in diameter slightly so as to allow a flow of pressure fluid therearound. This portion 41, however, is of such a size that the surface 42 thereof engages the check valve 36, as seen in Fig. 5, so as to maintain the valve spaced from the seat 38. When, however, the cap member is unthreaded a short distance, as seen in Fig. 4, the surface 42 moves away from the valve 36 and allows the valve to engage the seat 38, as best seen in Fig. 4. In this manner the high pressure in the valve chamber is cut off from the top of the reservoir. A vent 44 is provided in the cap 40 adjacent the top thereof so that it will move out of the threaded area in the housing when the cap unseats the valve 36. This permits the escape of any pressure in the reservoir chamber 20 above the piston or separator partition 45.

This arrangement and construction permits the testing of each reservoir to determine whether that reservoir is on the high pressure or the low pressure side of the valve. In this manner when the attendant desires to lubricate the valve, if he is not positive as to which is the low pressure side, it is only necessary for him to unscrew the caps of both reservoirs. The high pressure reservoir will be subjected to the high pressure on the lower side thereof thru the port 28 and passage 26, while the downstream reservoir will not be subjected to any such pressure.

The difference therefore between the high and the low pressure reservoirs can be determined by the attendant due to the volume of discharge thru the vent 44 when the caps are unscrewed. This is of material advantage because in many instances large volumes of lubricant are entirely wasted, due to the fact that the attendant, not knowing which is the downstream side, lubricates the valve an excessive amount, which is merely forced thru the high pressure side and flows into the line to be lost. The loss of a lubricant is not only uneconomical but this excess lubricant flowing into the line is often objectionable.

With the present type of valve the operator can ascertain for himself which is the downstream side of the valve by conducting the simple test heretofore described so that he need lubricate only the downstream side of the valve.

Figure 8:
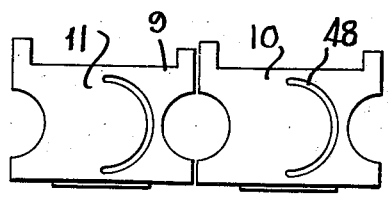
Figs. 7 and 8 are flattened views of the ports in the housing and the surface of the plug member respectively.
Figure 7:
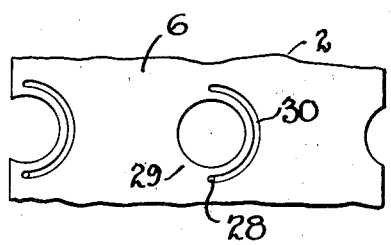

Figs. 1 and 8 show the lubricant distribution grooves such as 48, which are provided on the plug member. The grooves 30 and 48 come into contact with each other when the valve is in closed position so as to form a circular distribution groove about each of the ports 7 and 8 when the valve is closed.

Broadly the invention contemplates a dual lubricant system for valves which can be readily tested to determine the high and the low pressure sides of the valve and to permit entirely independent lubrication of each side of the valve so that the valve can be used as a two-way valve.

What is claimed is:

1. A lubricated valve including a housing, a ported plug therein, ports in the opposite sides of said housing, an independent lubricant system to provide a seal for each of the housing ports including a reservoir in the housing, means to independently conduct the line pressure from the plug into the housing to each of said reservoirs, a two way check valve in each of said means, a seat for said valve to prevent back flow from the reservoir and another seat to shut off flow to the plug chamber from the reservoir, means stopping said check valve to hold it from said last seat except when the reservoir is being opened, additional means forming a part of each system to independently force lubricant into each of the said reservoirs and to distribute the lubricant to seal said ports.

2. A lubricated valve including a housing, a ported plug therein, ports in the opposite sides of said housing, an independent lubricant system to provide a seal for each of the housing ports including a reservoir in the housing, means to independently conduct the line pressure from the plug into the housing to each of said reservoirs, a two way check valve in each of said means, a seat for said valve to prevent back flow from the reservoir and another seat to shut off flow to the plug chamber from the reservoir, means stopping said check valve to hold it from said last seat except when the reservoir is being opened, additional means forming a part of each system to independently force lubricant into each of the said reservoirs and to distribute the lubricant to seal said ports, said reservoirs extending longitudinally of the plug and having the line pressure means connected at the top and said additional means connected to the base.

3. A lubricated plug valve including a housing, a plug chamber therein, a port at each side of the chamber, a distribution groove adjacent each port, a reservoir in said housing adjacent each port, means in the housing to conduct lubricant from each reservoir to its adjacent groove, means in the housing connecting each reservoir to the plug chamber at another point so as to lead line pressure in the housing to each reservoir, and means to close said connecting means to the escape of pressure from the plug chamber when said housing reservoirs are opened.

4. A lubricated plug valve including a housing, a plug chamber therein, a port at each side of the chamber, a distribution groove adjacent each port, a reservoir in said housing adjacent each port, means to conduct lubricant from each reservoir to its adjacent groove, and means connecting each reservoir to the plug chamber at another point so as to lead line pressure to each reservoir, and still additional means to test each reservoir for pressure so as to determine the high and lower pressure sides of the valve by the pressure in the respective reservoirs.

5. A lubricated plug valve including a housing, a plug chamber therein, a port at each side of the chamber, a distribution groove adjacent each port, a reservoir in said housing adjacent each port, means to conduct lubricant from each reservoir to its adjacent groove, and means connecting each reservoir to the plug chamber at another point so as to lead line pressure to each reservoir, and still additional means to test each reservoir for pressure so as to determine the high and low pressure sides of the valve by the pressure in the respective reservoirs, including a reservoir cap to vent the confined pressure and to shut off the line pressure at one end of the reservoir.

6. A lubricated plug valve including a housing, a plug chamber therein, a port at each side of the chamber, a distribution groove adjacent each port, a reservoir in said housing adjacent each port, means to conduct lubricant from each reservoir to its adjacent groove, and means connecting each reservoir to the plug chamber at another point so as to lead line pressure to each reservoir, and still additional means to test each reservoir for pressure so as to determine the high and low pressure sides of the valve by the pressure in the respective reservoirs, including a reservoir cap to vent the confined pressure and to shut off the line pressure at one end of the reservoir by the release of a check valve.

7. In a lubricated type of plug valve, a housing, a plug valve member therein, a lubricant reservoir in the housing, and a two way check valve control for the line pressure to the reservoir including a passage for such pressure from the valve chamber to the lubricant reservoir, a ball valve in said passage, a seat at each end of the passage, and means to retain the ball valve unseated at one seat so as to control the flow of pressure thru that seat to the reservoir.

8. A two way check valve control for the line pressure to the reservoir of a lubricated valve including a passage for such pressure from the valve chamber to the lubricant reservoir, a ball valve in said passage, a seat at each end of the passage, and means to retain the ball valve unseated at one seat so as to control the flow of pressure thru that seat to the reservoir, said means including a reservoir cap having a portion to unseat said valve when the cap is in closed position.

9. In a lubricated valve including a two part plug member, a dual lubrication system, one for each plug part, each system including a reservoir in the valve housing, means to conduct line pressure into the housing to one portion of each reservoir, a check valve in each said means, means in the housing for the inlet and outlet of lubricant relative to each reservoir so that either reservoir may be utilized and either side of the valve may be used as the high pressure side, and means closing each reservoir and holding said valve unseated.

10. In a lubricated valve including a two part plug member, a dual lubrication system, one for each plug part, each system including a reservoir in the valve housing, means to conduct line pressure to one portion of each reservoir means for the inlet and outlet of lubricant relative to each reservoir so that either side of the valve may be used as the high pressure side, and additional means to test each reservoir for pressure.

ALEXANDER S. VOLPIN.